United States Patent Office 3,312,884
Patented Apr. 4, 1967

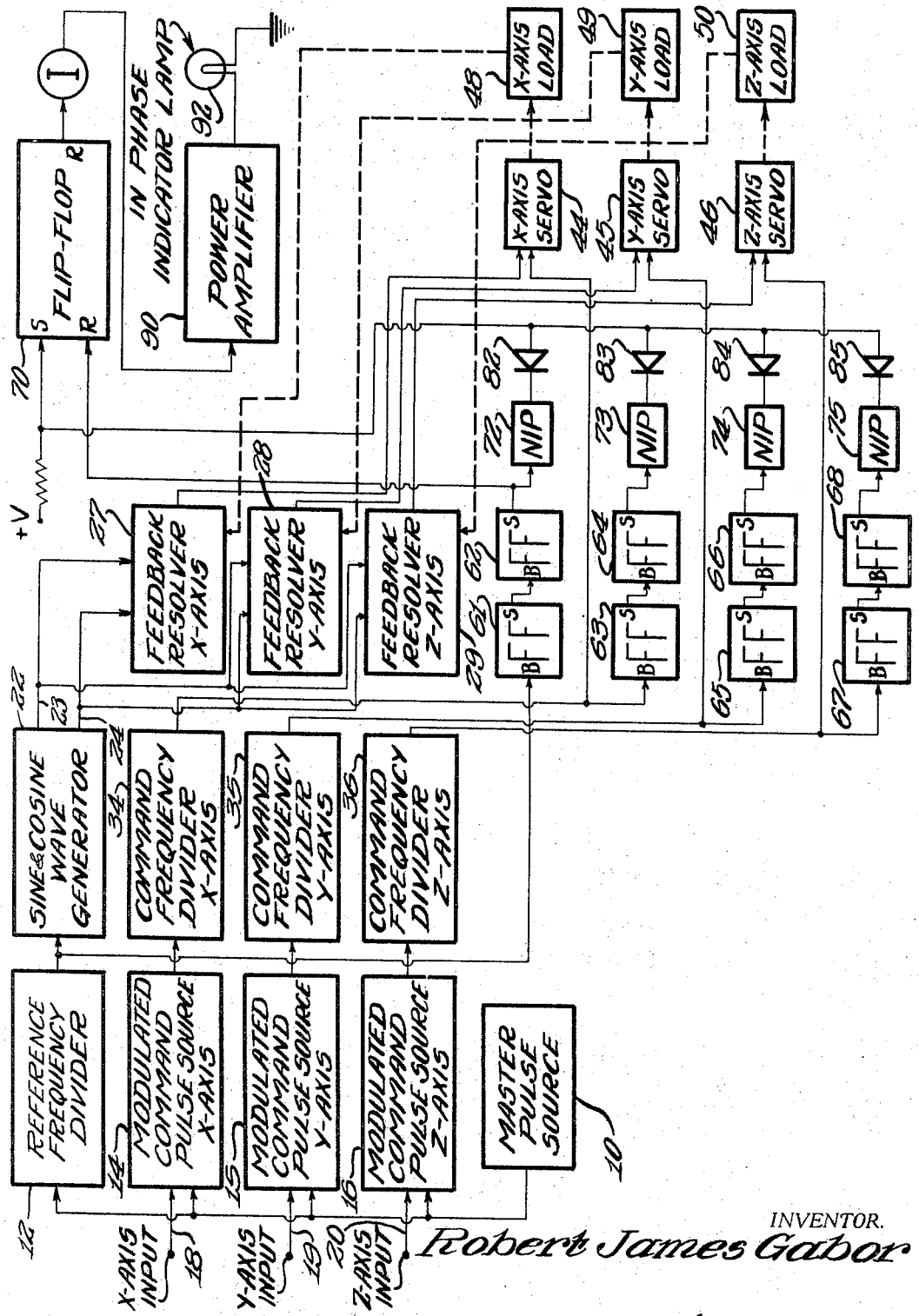

3,312,884
IN PHASE DETECTOR
Robert James Gabor, Willoughby, Ohio, assignor to The Bunker-Ramo Corporation, Stamford, Conn., a corporation of Delaware
Filed Nov. 27, 1964, Ser. No. 414,254
6 Claims. (Cl. 318—162)

This invention relates to an in phase indicating system and method and particularly to a numerical control system having means for signaling when the command waveforms for the respective axes being controlled are simultaneously in phase with a reference waveform.

It is an important object of the present invention to provide an in phase indicating method and means for a multi-axis numerical control system.

Another important object of the present invention resides in the provision of a numerical control system having an in phase indicator with a resolution equal to the system resolution.

Another object of the invention is to provide an in phase indicator for servomechanism systems which indicator is capable of distinguishing between an in phase condition and a phase error of 360 degrees.

Still another object of the invention is to provide an in phase indicator system which is readily applied to the sensing of a simultaneous in phase condition of any desired number of servo control loops.

Other objects, features and advantages of the present invention will be apparent from the following detailed description taken in connection with the accompanying drawing, in which:

The single figure shows an exemplary in phase detector system in accordance with the present invention.

While the present system may be utilized with many different types of numerical contouring control systems as well as point to point numerical control systems, the illustrated system is similar to that of the McGarrell U.S. Patent 3,079,522 issued Feb. 26, 1963. As illustrated in that patent, a numerical contouring system may comprise a master pulse source 10 supplying a reference frequency divider 12 and a series of modulated command pulse sources for respective axes of the system such as indicated at 14–16. Information inputs have been indicated at 18–20 for the components 14–16. This information may be derived from punched paper tape, for example, and may represent successive increments of movement along the respective axes of the system.

The reference frequency divider may deliver a reference square wave signal having a frequency of 200 cycles per second, for example, which square wave signal may be converted by component 22 to a sine wave on output line 23 and a cosine wave on output line 24 of the fundamental frequency such as 200 cycles per second. These outputs may be utilized to excite standard feedback resolvers such as indicated at 27–29.

The modulated pulse trains from components 14–16 are supplied to respective command frequency divider components 34–36 which supply output square waves with a carrier frequency corresponding to the output of component 22, for example a carrier frequency of 200 cycles per second.

As illustated the outputs of components 27 and 34 may be supplied to the X-axis servo circuitry indicated by the reference numeral 44; the outputs of components 28 and 35 may be supplied to the Y-axis servo circuitry designated by the reference numeral 45; and the outputs of components 29 and 36 may be supplied to the Z-axis servo circuitry designated by the reference numeral 46. The components 44–46 may have a suitable sine wave amplifier and squaring circuit as illustrated in said McGarrell patent, so that feedback rectangular waveform current and command responsive rectangular waveform current in the component 44 having the same carrier frequency is obtained. These two waveforms are supplied to suitable phase demodulation circuitry as illustrated in said McGarrell patent, the error signal from such phase demodulating circuitry being utilized to drive an output element along each of the respective axes such as represented by components 48–50. The movement of the output elements 48–50 is, of course, coupled to the feedback resolver components 27–29, respectively, so that the feedback responsive waveforms at the output of components 27–29 are a function of the instantaneous load position of the respective axis.

The present invention is concerned with providing an indication when there is substantially a zero error in phase between the reference waveform from component 12 and the command responsive waveforms from components 34–36.

In the preferred embodiment, each of these waveforms has its frequency divided by the same number so as to provide a reduced frequency waveform. In the specific example given, the frequencies are divided by four by means of respective series of flip-flops 61–62, 63–64, 65–66, and 67–68. The set output of flip-flop 62 is supplied to a reset input of a flip-flop component 70, while the set outputs of each of components 62, 64, 66 and 68 is supplied to one of the respective negative input pulser components 72–75. The NIP circuits 72–75 preferably provide a positive pulse output having a duration less than the minimum spacing between successive command pulses from components 14–16. For example, where the minimum command pulse spacing is 5 microseconds (and a carrier command pulse frequency of 100 kilocycles per second), the pulse duration from components 72–75 may be four microseconds.

The NIP outputs and ANDed by the diodes 82–85. When all the frequency dividers have their outputs in phase with each other, a pulse is present at the output of the gate provided by components 82–85, thus setting the flip-flop 70. If at the beginning of the next cycle the counters or frequency dividers 12 and 34–36 are still in phase, the flip-flop will be again set, having been reset by the set output of component 62. Thus, as long as an "in phase" condition exists, the output of the flip-flop 70 will be a 50% duty cycle square wave. If one or more of the command frequency dividers are phase shifted, the flip-flop 70 will not be set again after it has been reset by the output from flip-flop 62, thus yielding a logic low output. The output of the flip-flop 70 is used to drive a power driver component 90 connected to an in phase indicator lamp 92 which may be located on the control panel of the system.

Where the square wave outputs of the frequency dividers have a carrier frequency of 200 cycles per second, a phase shift of 360 degrees might correspond to an incremental distance of 0.1000 inch. This means that the in phase detector would not determine whether or not the frequency dividers were out of phase by exactly 360 degrees where the components 72–75 are connected directly to the outputs of components 12 and 34–36.

In the illustrated embodiment, however, the maximum range is increased by dividing the output of the frequency divider components 12 and 34–36 down to a substantially reduced frequency for example by using binary flip-flops 61–68. Using the divide by four arrangement shown in the drawing, the range can be increased to 0.4 inch. Using four flip-flops, the range can be increased to 1.6 inches which would be quite adequate in systems employing a four digit interpolator with a maximum capability of 0.9999 inch.

There is no limit as to the number of frequency dividers or servo loops on which the in phase indicator system may be used.

The present invention is applicable to the case where an in phase signal is desired when all command waveforms are in phase, without comparison to the phase of a fixed phase signal such as supplied by frequency divider 12. Further, the system may be such as to signal when each command waveform is in phase with each of the other command waveforms and with the feedback responsive waveforms from the respective resolvers or other position transducers. Thus the term "reference waveform" as used in the appended claims is to be construed broadly so as to cover a waveform whose phase is not necessarily fixed at all times.

It will be apparent that many modifications and variations may be effected without departing from the scope of the novel concepts of the present invention.

I claim as my invention:

1. A detector system comprising
   means for generating a reference waveform and a series of phase modulated command waveforms representing command information relative to said reference waveform with respect to a plurality of axes of movement,
   respective servo means responsive to the respective phase modulated command waveforms to move respective output elements along the respective axes of movement toward respective commanded positions, and
   means responsive to said reference waveform and to each of said command waveforms to signal when all of the command waveforms are simultaneously exhibiting a substantially zero phase error relative to said reference waveform.

2. A detector system comprising
   means for generating a reference waveform and a series of phase modulated command waveforms representing command information relative to said reference waveform with respect to a plurality of axes of movement,
   respective servo means responsive to the respective phase modulated command waveforms to move respective output elements along the respective axes of movement toward respective commanded positions,
   frequency division means for dividing the frequency of said reference and command waveforms by the same factor to supply reduced frequency reference and command waveforms, and
   means responsive to said reduced frequency reference and command waveforms to signal when all of the reduced frequency command waveforms are simultaneously exhibiting a predetermined phase relationship to said reduced frequency reference waveform.

3. In a control system including digital command means for generating a command pulse train having a predetermined carrier frequency and for modulating said pulse train in discrete increments to produce a modulated pulse train having a minimum time spacing of successive command pulses, means responsive to said command pulse train for generating a command responsive waveform having a predetermined carrier frequency substantially less than the carrier frequency of said command pulse train, means for generating a reference waveform of said predetermined carrier frequency, the command responsive and reference waveforms each having waveform portions of different amplitude levels and having excursions between the different amplitude levels occurring periodically and at substantially the same time when the waveforms are in phase, the modulation of said pulse train by one increment producing a shift in the timing of the excursions of said command responsive waveform relative to the corresponding excursions of said reference waveform by a discrete increment, and servo means controlling movement of a load along an axis and responsive to said command responsive waveform and said reference waveform having said predetermined carrier frequency to produce a predetermined increment of movement of said load along said axis for each discrete increment of time difference in the occurrence of the corresponding excursions of said waveforms, the improvement comprising the combination with the aforesaid means of
   pulse generating means responsive to the excursions of said command responsive waveform and to the excursions of said reference waveform for generating respectively command phase indicating pulses and reference phase indicating pulses each having a time duration less than said minimum time spacing of successive command pulses, with the command phase indicating pulses and the reference phase indicating pulses occurring respectively in response to the excursions of the command responsive waveform and the reference waveform, and
   coincidence gating means responsive to the time coincidence of said command phase indicating pulses and said reference phase indicating pulses to signal an in phase condition of the system.

4. In a control system including means for generating a reference waveform having a predetermined carrier frequency, means for generating a command responsive waveform having said predetermined carrier frequency and for modulating the phase of said command responsive waveform in predetermined increments relative to said reference waveform, and servo means responsive to said reference waveform and said command responsive waveform of said predetermined carrier frequency for producing an increment of output movement in response to each increment of phase difference between said command responsive waveform and said reference waveform, the improvement comprising the combination with the aforesaid means of
   frequency dividing means receiving said command responsive waveform and for dividing the frequency of said command responsive waveform to produce a reduced frequency command responsive waveform having a reduced carrier frequency substantially less than said predetermined carrier frequency,
   means responsive to said reference waveform for producing a reference waveform of said reduced frequency, and
   means responsive to a predetermined phase relation between said reduced frequency command responsive waveform and said reference waveform of said reduced frequency to produce an in phase output signal signifying an in phase condition of said control system.

5. In a control system including means for generating a reference waveform having a predetermined carrier frequency, means for generating a command responsive waveform having said predetermined carrier frequency and for modulating the phase of said command responsive waveform in predetermined increments relative to said reference waveform, and servo means responsive to said reference waveform and said command responsive waveform of said predetermined carrier frequency for producing an increment of output movement in response to each increment of phase difference between said command responsive waveform and said reference waveform, the improvement comprising the combination with the aforesaid means of
   frequency dividing means receiving said command responsive waveform and for dividing the frequency of said command responsive waveform to produce a reduced frequency command responsive waveform having a reduced carrier frequency substantially less than said predetermined carrier frequency,
   means responsive to said reference waveform for producing a reference waveform of said reduced frequency,
   coincidence gating means responsive to an in phase condition of said reduced frequency command responsive waveform and said reference waveform of said reduced frequency to generate a coincidence signal, and visual indicator means responsive to said coincidence signal to provide a visual indication of the in phase condition of said system.

6. In a control system including means for generating a reference waveform having a predetermined carrier frequency, means for generating a command responsive waveform having said predetermined carrier frequency and for modulating the phase of said command responsive waveform in predetermined increments relative to said reference waveform, and servo means responsive to said reference waveform and said command responsive waveform of said predetermined carrier frequency for producing an increment of output movement in response to each increment of phase difference between said command responsive waveform and said reference waveform, the improvement comprising the combination with the aforesaid means of frequency dividing means receiving said command responsive waveform and for dividing the frequency of said command responsive waveform to produce a reduced frequency command responsive waveform having a reduced carrier frequency substantially less than said predetermined carrier frequency, means responsive to said reference waveform for producing a reference waveform of said reduced frequency, coincidence gating means responsive to an in phase condition of said reduced frequency command responsive waveform and said reference waveform of said reduced frequency to generate a coincidence signal, flip-flop means responsive to a coincidence signal from said gating means to generate a fluctuating output waveform and to continue generating such waveform periodically so long as coincidence signals are supplied thereto, but remaining in one of its stable states in the absence of coincidence signals from said gating means, and visual indicator means responsive to said fluctuating output from said flip-flop means to provide a visual indication of the phase condition of said system.

References Cited by the Examiner

UNITED STATES PATENTS

| 2,946,004 | 7/1960 | Frank | 324—83 |
| 3,040,222 | 6/1962 | Kunz | 324—83 |
| 3,079,522 | 2/1963 | McGarrell | 318—162 |
| 3,200,340 | 8/1965 | Dunne | 328—110 X |
| 3,210,552 | 10/1965 | Young | 328—110 X |

WALTER L. CARLSON, *Primary Examiner.*

P. F. WILLE, *Assistant Examiner.*